(12) United States Patent
Tesar (10) Patent No.: US 7,122,926 B2
(45) Date of Patent: Oct. 17, 2006

(54) FAULT-TOLERANT ROTARY ACTUATOR

(76) Inventor: Delbert Tesar, 8005 Two Coves Dr., Austin, TX (US) 78730

( * ) Notice: Subject to any disclaimer, the term of this patent is extended or adjusted under 35 U.S.C. 154(b) by 0 days.

(21) Appl. No.: 10/665,729

(22) Filed: Sep. 18, 2003

(65) Prior Publication Data

US 2004/0103742 A1 Jun. 3, 2004

Related U.S. Application Data

(60) Provisional application No. 60/411,979, filed on Sep. 19, 2002.

(51) Int. Cl.
*H02K 7/10* (2006.01)

(52) U.S. Cl. .......................... 310/75 R; 310/78; 310/92; 475/149; 74/490.03

(58) Field of Classification Search .............. 310/75 R, 310/76–78, 82–83, 92–96; 475/149–157, 475/168–180; 74/490.03
See application file for complete search history.

(56) References Cited

U.S. PATENT DOCUMENTS

| | | | |
|---|---|---|---|
| 276,776 | A | 5/1883 | Clemons |
| 474,903 | A | 5/1892 | Cottrell |
| 546,249 | A | 9/1895 | Regan |
| 908,529 | A | 1/1909 | Williams |
| 978,371 | A | 12/1910 | Harrison |
| 1,009,954 | A | 1/1911 | De Briones |
| 987,430 | A | 3/1911 | Conant |
| 1,192,627 | A | 7/1916 | Hatlee |
| 1,217,427 | A | 2/1917 | Fast |
| 1,282,172 | A | 10/1918 | Beirns |
| 1,313,537 | A | 8/1919 | Jones |
| 1,499,763 | A | 7/1924 | Davis |
| 1,514,938 | A | 11/1924 | Taub |
| 1,590,166 | A | 6/1926 | Howard |
| 1,601,750 | A | 10/1926 | Wildhaber |
| 1,641,766 | A | 9/1927 | Laukhuff |
| 1,693,154 | A | 11/1928 | Newmann |
| 1,694,031 | A | 12/1928 | Braren |
| 1,735,662 | A | 11/1929 | Trevino |
| 1,767,866 | A | 6/1930 | Wildhaber |
| 1,770,035 | A | 7/1930 | Heap et al. |
| 1,831,903 | A | 11/1931 | Chrisman et al. |
| 1,844,471 | A | 2/1932 | Johnson |

(Continued)

FOREIGN PATENT DOCUMENTS

GB 2271025 3/1994

OTHER PUBLICATIONS yet2.com, TeckPak, Traction electric motor (generator) in an epicyclic configuration, Aug. 9, 2002, 6 pp.
The "Quadrant Drive" Speed Reducer Drive System, copyright date unknown, 4 pp. info@plumettaz.ch.
Darali Cycloidal Reducers, ISO–9002, Cyclo0idal Advantage, 11 pp.
Mectrol—Products Information: Reducers: Features and Benefits, Jun. 17, 2002, 4 pp.
Sharke, Paul, The start of a new movement, Mechanical Engineering, Aug., 2002, 4 pp., Surrey BC Canada.
Ikona Gear Technologies, Inc. Information, 7 pp., ikonagear.com.

*Primary Examiner*—Thanh Lam (57) ABSTRACT

A fault-tolerant actuator module, in a single containment shell, containing two actuator subsystems that are either asymmetrically or symmetrically laid out is provided. Fault tolerance in the actuators of the present invention is achieved by the employment of dual sets of equal resources. Dual resources are integrated into single modules, with each having the external appearance and functionality of a single set of resources.

22 Claims, 8 Drawing Sheets

U.S. PATENT DOCUMENTS

| | | |
|---|---|---|
| 1,942,795 A | 1/1934 | Benson |
| 2,026,880 A | 1/1936 | Fliesberg et al. |
| 2,037,787 A | 4/1936 | Hughes |
| 2,049,696 A | 8/1936 | Fliesberg |
| 2,108,384 A | 2/1938 | Moisy |
| 2,168,164 A | 8/1939 | Kittredge |
| 2,170,951 A | 8/1939 | Perry |
| 2,250,259 A | 7/1941 | Foote, Jr. |
| 2,303,365 A | 12/1942 | Karlsen |
| 2,382,482 A | 8/1945 | Henry |
| 2,408,993 A * | 10/1946 | Nardone .................... 477/12 |
| 2,475,504 A | 7/1949 | Jackson |
| 2,481,627 A | 9/1949 | Sharpe |
| 2,482,568 A | 9/1949 | Werner |
| 2,495,811 A | 1/1950 | Hollmann |
| 2,666,336 A | 1/1954 | Gerotors |
| 2,677,288 A | 5/1954 | Gnahrich |
| 2,709,929 A | 7/1955 | Godwin |
| 2,748,616 A | 7/1956 | Foster et al. |
| 2,837,937 A | 6/1958 | Kraus |
| 2,881,619 A | 4/1959 | Fox et al. |
| 2,922,294 A | 1/1960 | Wildhaber |
| 2,966,078 A | 12/1960 | Wright |
| 2,972,910 A | 2/1961 | Menge |
| 3,011,304 A | 12/1961 | Sundt |
| 3,019,705 A | 2/1962 | Wilkinson |
| 3,028,513 A | 4/1962 | Sundt |
| 3,037,400 A | 6/1962 | Sundt |
| 3,056,315 A | 10/1962 | Mros |
| 3,144,791 A | 8/1964 | Menge, Sr. |
| 3,160,032 A | 12/1964 | Black |
| 3,192,799 A | 7/1965 | Pamplin |
| 3,307,434 A | 3/1967 | Kope |
| 3,413,896 A | 12/1968 | Wildhaber |
| 3,424,036 A | 1/1969 | Golgan |
| 3,427,901 A | 2/1969 | Wildhaber |
| 3,429,393 A | 2/1969 | Lorence |
| 3,451,290 A | 6/1969 | Wildhaber |
| 3,546,972 A | 12/1970 | Morozumi |
| 3,766,790 A | 10/1973 | Weir |
| 3,903,750 A | 9/1975 | Takasu |
| 3,924,478 A | 12/1975 | Takasu |
| 3,975,973 A | 8/1976 | Haase |
| 4,016,780 A | 4/1977 | Baranyi |
| 4,023,441 A | 5/1977 | Osterwalder |
| 4,155,276 A | 5/1979 | Fengler |
| 4,243,355 A | 1/1981 | Brudi et al. |
| 4,270,401 A | 6/1981 | Davidson |
| 4,452,102 A | 6/1984 | Shaffer |
| 4,512,213 A | 4/1985 | Newton |
| 4,603,594 A | 8/1986 | Grimm |
| 4,614,128 A | 9/1986 | Fickler |
| 4,679,485 A | 7/1987 | Nelson et al. |
| 4,745,815 A | 5/1988 | Klopfenstein |
| 5,030,184 A | 7/1991 | Rennerfelt |
| 5,039,900 A | 8/1991 | Nashiki et al. |
| 5,136,201 A | 8/1992 | Culp |
| 5,144,851 A | 9/1992 | Grimm et al. |
| 5,214,972 A | 6/1993 | Larson et al. |
| 5,232,412 A | 8/1993 | Zheng et al. |
| 5,277,672 A | 1/1994 | Droulon et al. |
| 5,295,925 A | 3/1994 | Hirabayashi |
| 5,313,852 A | 5/1994 | Arena |
| 5,324,240 A | 6/1994 | Guttinger |
| 5,505,668 A | 4/1996 | Koriakov-Savoysky |
| 5,633,554 A | 5/1997 | Kaji |
| 5,685,694 A | 11/1997 | Jones et al. |
| 5,809,837 A | 9/1998 | Shaffer |
| 5,910,066 A | 6/1999 | Schulz et al. |
| 5,957,798 A | 9/1999 | Smith, III et al. |
| 5,957,803 A * | 9/1999 | Fini, Jr. .................... 475/306 |
| 5,957,804 A | 9/1999 | Schulz et al. |
| 5,964,154 A | 10/1999 | Michalik |
| 5,990,587 A | 11/1999 | Shimanovich et al. |
| 6,034,466 A | 3/2000 | Blanding et al. |
| 6,098,479 A | 8/2000 | Hoermansdoerfer |
| 6,102,827 A | 8/2000 | Teasdale et al. |
| 6,107,726 A | 8/2000 | Near et al. |
| 6,123,640 A | 9/2000 | Schulz |
| 6,158,295 A | 12/2000 | Nielsen |
| 6,184,608 B1 | 2/2001 | Cabuz et al. |
| 6,192,321 B1 | 2/2001 | Grumstrup et al. |
| 6,220,984 B1 | 4/2001 | Schulz et al. |
| 6,244,843 B1 | 6/2001 | Kosuge |
| 6,269,702 B1 | 8/2001 | Lambson |
| 6,294,859 B1 | 9/2001 | Jaenker |
| 6,307,301 B1 | 10/2001 | Ngo et al. |
| 6,313,568 B1 | 11/2001 | Sullivan et al. |
| 6,327,927 B1 * | 12/2001 | Rogg et al. ................. 74/335 |
| 2003/0184171 A1 * | 10/2003 | Teraoka et al. ............ 310/80 |

\* cited by examiner

FAULT-TOLERANT ROTARY ACTUATOR

CROSS-REFERENCE TO RELATED APPLICATION

This application claims the benefit of U.S. Provisional Application No. 60/411,979, filed Sep. 19, 2002.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of DE-FG04-94EW37966 awarded by the U.S. Department of Energy and N00014-01-10864 awarded by the Office of Naval Research.

BACKGROUND OF THE INVENTION

The present invention relates generally to rotary actuators and more specifically to rotary actuators having improved fault-tolerance.

Rotary actuators are the most common drivers of our machines. The partial or complete failure of an actuator can cause a life threatening accident, result in costly downtime, or prevent the continuation of a critical long-duration process, such as micro-surgery. In certain applications, it is crucial that the actuator continue to function even in the event of a fault or failure in the system. Such a fault might occur, for example, in the electronics, wiring, sensors, prime mover, or gear train of the system.

Continued operation under a fault is especially desirable where long-duration missions are involved, where human life is at stake, or where a large economic loss would occur. Fault-tolerant designs have been developed incorporating excess actuators into the system in order to create an excess of inputs, thereby creating a redundant system. In such systems, this redundancy then necessitates that a huge number of decisions must be made in real time at the system level in order to get the whole system to reliably produce a desired output motion or force. Owing to inherent resulting output uncertainty, this approach is still largely a laboratory approach that is rarely used in industrial production systems.

SUMMARY OF THE INVENTION

The present invention solves many problems associated with current fault-tolerant designs and overcomes problems associated with current approaches, development of redundant systems and output uncertainties.

In certain embodiments, the present invention is a fully integrated actuator module, in a completely concentric arrangement in a single containment shell, containing two equal actuator subsystems that are either asymmetrically or symmetrically laid out. Both symmetric and asymmetric embodiments are described in detail herein.

Fault tolerance in the actuators of the present invention is achieved by the employment of dual sets of equal resources. In the embodiments described herein, dual resources are integrated into single modules, with each having the external appearance and functionality of a single set of resources.

In certain embodiments disclosed herein, the actuators employ a force-summing architecture wherein the dual output velocities are the same but the dual equal forces are summed to double the output load capacity. Should one side completely fail, then a clutch on that side would be disengaged to take that side out of action, leaving the other side to operate to return the system to home base in a 'limp home' mode, after which maintenance by module replacement can occur.

In other embodiments, the actuators employ a velocity-summing architecture wherein the velocities are summed, but the maximum torque output is limited to the torque output from each individual actuator. In these embodiments, should one side completely fail, then a clutch would be engaged on that side to lock that side in place and take that side out of action, leaving the other side to operate the system.

In one embodiment, the present invention is a rotary actuator having a fixed structure, with first and second prime movers attached to the fixed structure. The first prime mover has a first portion fixed to the fixed structure, and a second portion rotationally movable with respect to the first portion. The second prime mover has a first portion fixed to the fixed structure, and a second portion rotationally movable with respect to the first portion. The actuator incorporates a first gearset having an input portion connected to the second portion of the first prime mover and an output portion, as well as a second gearset having an input connected to the second portion of the second prime mover and an output portion. The actuator incorporates a first clutch having an input portion connected to the output portion of the first gearset and an output portion, and a second clutch having an input portion connected to the output portion of the second gearset and an output portion. The actuator incorporates dual equal outputs. A first actuator output is rotationally fixed to the output portion of the first clutch, and a second actuator output is rotationally fixed to the output portion of the second clutch.

In a second embodiment, the present invention is a rotary actuator having a fixed structure having first and second prime movers attached thereto. The first prime mover has a first portion fixed to the fixed structure, and a second portion rotationally movable with respect to the first portion. The second prime mover also has a first portion fixed to the fixed structure, and a second portion rotationally movable with respect to the first portion. A first gearset has an input portion connected to the second portion of the first prime mover and an output portion. A second gearset has an input connected to the second portion of the second prime mover and an output portion. A first clutch has an input portion connected to the output portion of the first gearset and an output portion. A second clutch has an input portion connected to the output portion of the second gearset and an output portion. An actuator output is rotationally fixed to the output portion of the first clutch and the output portion of the second clutch.

Those skilled in the art will further appreciate the above-noted features and advantages of the invention together with other important aspects thereof. Upon reading the detailed description which follows in conjunction with the drawings.

BRIEF DESCRIPTION OF SEVERAL VIEWS OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Although making and using various embodiments of the present invention are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows like parts are marked throughout the specification and drawing with the same reference numerals, respectively. The drawing figures are not necessarily to scale and certain features may be shown exaggerated in scale or in somewhat generalized or schematic form in the interest of clarity and conciseness.

Figure 1A:
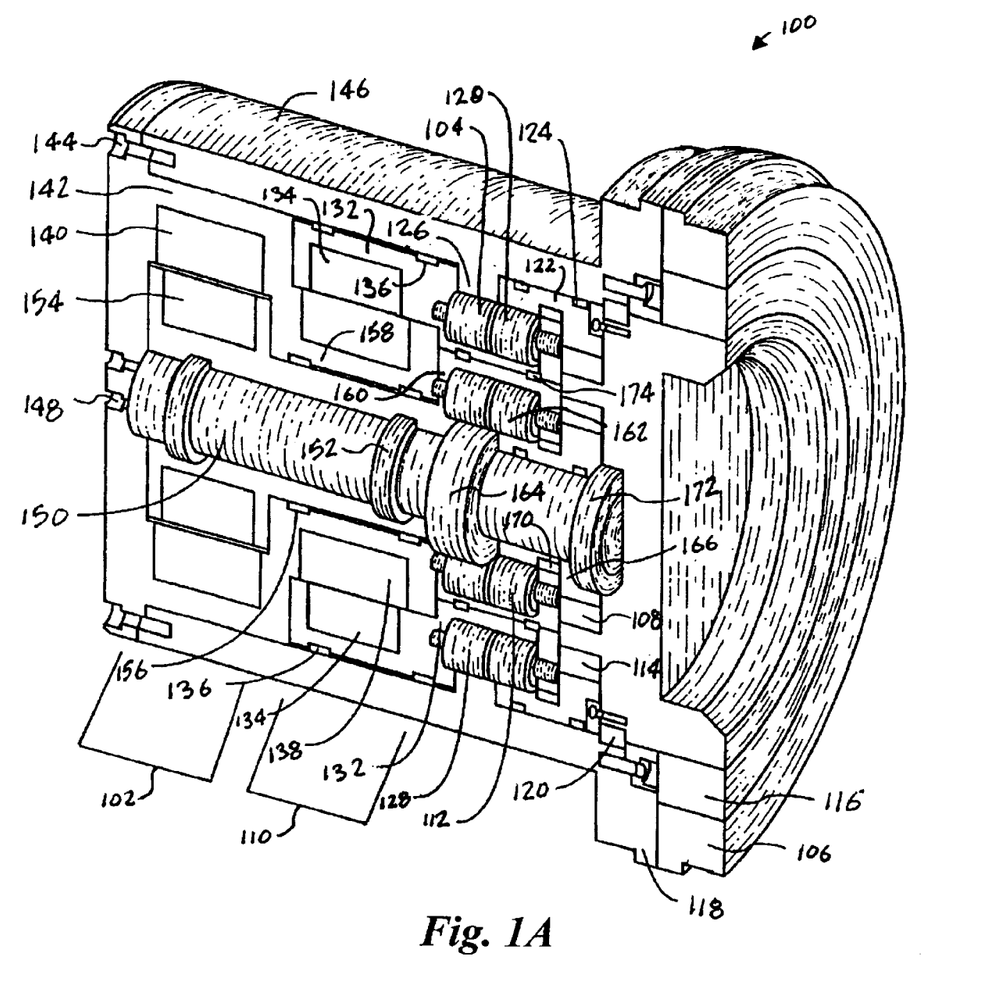
FIG. 1A is a three-dimensional section view of a first embodiment of a rotary actuator in accordance with the present invention.
Figure 1B:
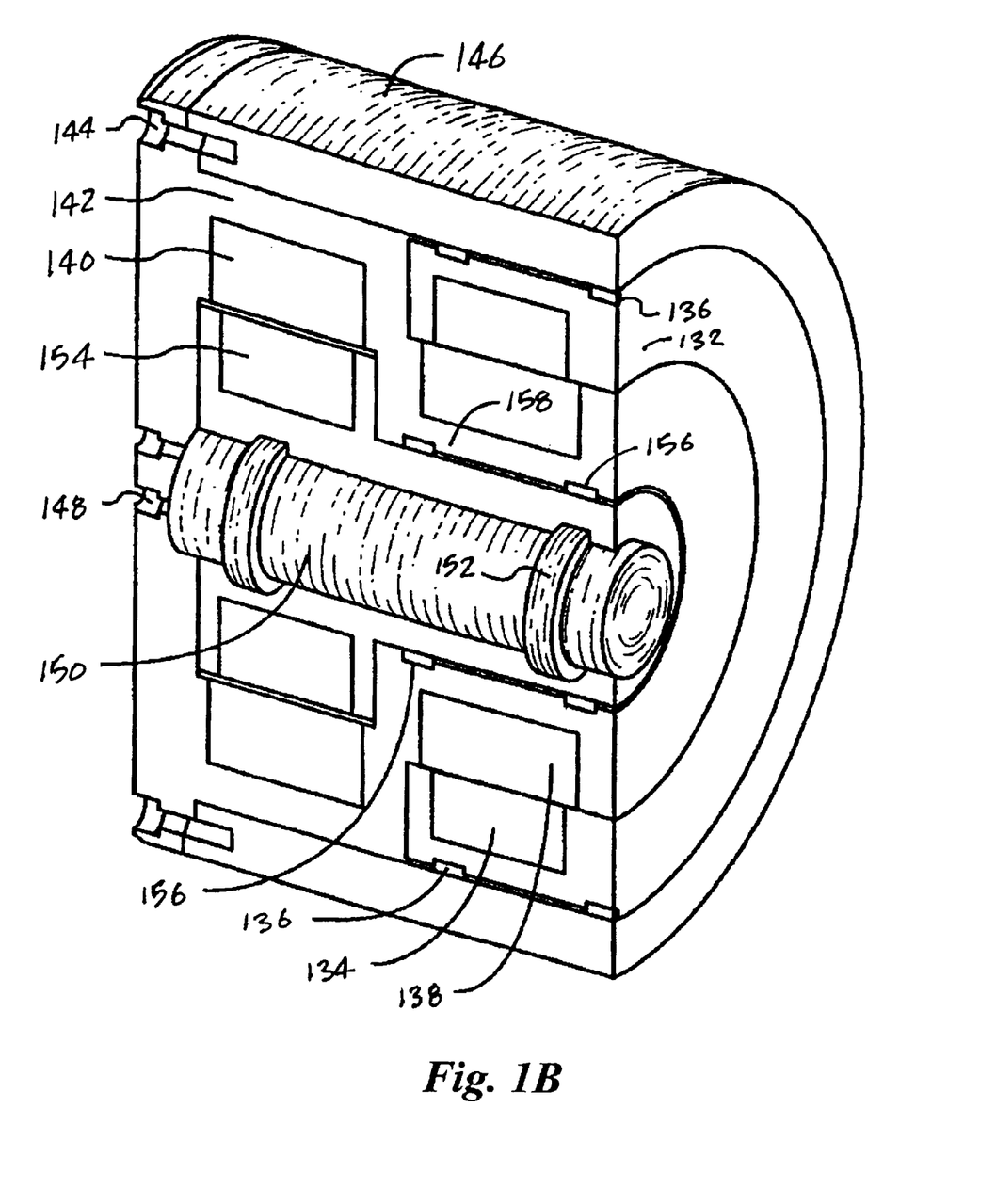
FIG. 1B is a three-dimensional section view of the prime mover section of the rotary actuator of FIG. 1A.
Figure 1C:
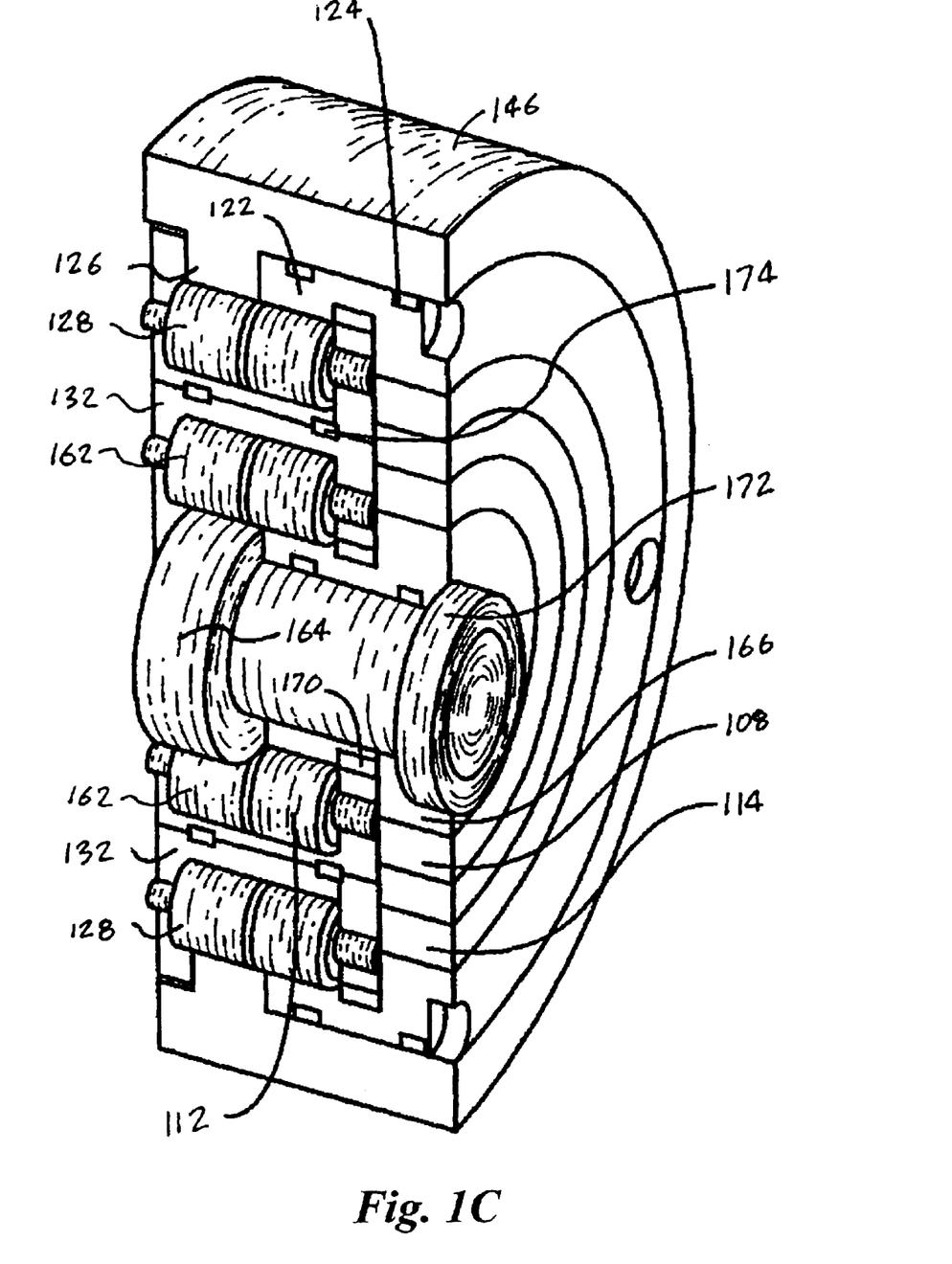
FIG. 1C is a three-dimensional section view of the gear train section of the rotary actuator of FIG. 1A.
Figure 1D:
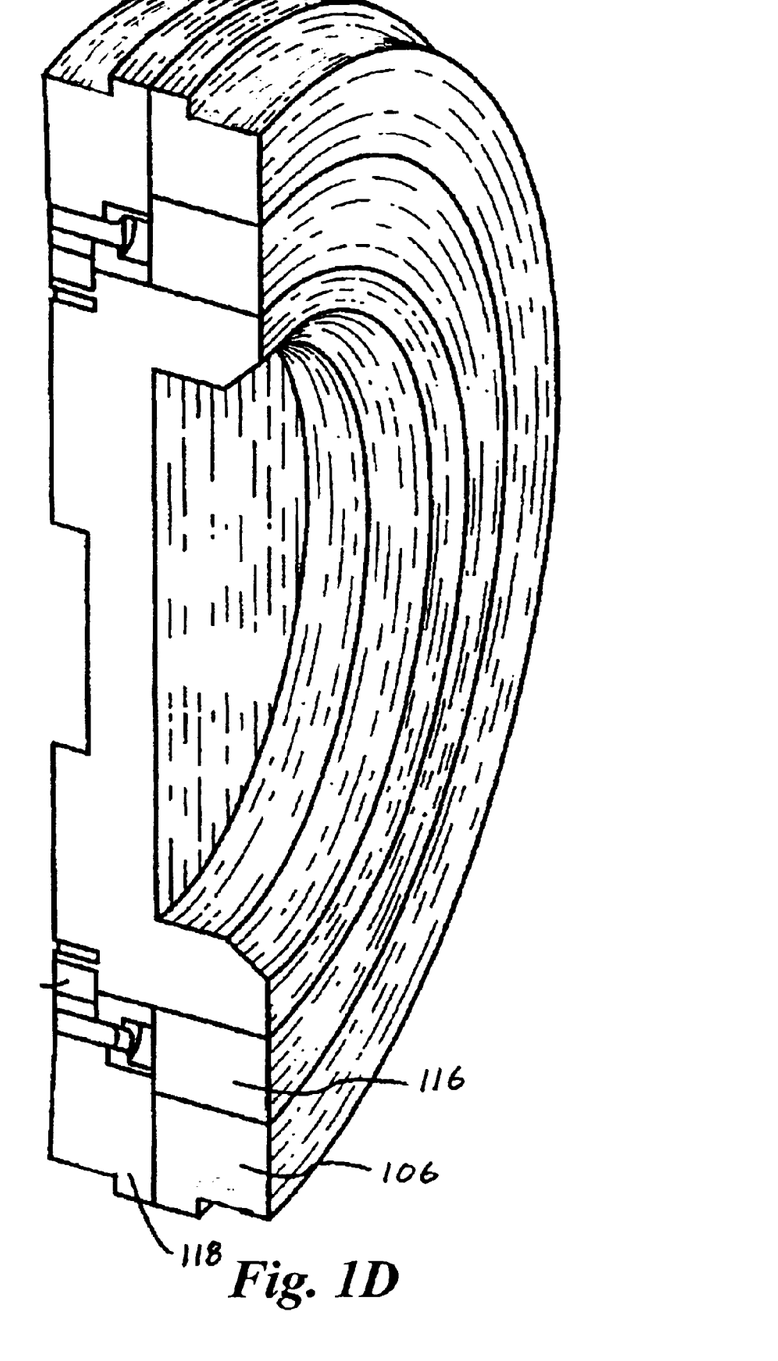
FIG. 1D is a three-dimensional section view of the output section of the rotary actuator of FIG. 1A.

FIG. 1A is a three-dimensional section view of a first embodiment of a rotary actuator 100 in accordance with the present invention. FIG. 1B is a three-dimensional section view of the prime mover section of the rotary actuator 100 of FIG. 1A. FIG. 1C is a three-dimensional section view of a representative gear train section of the rotary actuator 100 of FIG. 1A. FIG. 1D is a three-dimensional section view of the output section of the rotary actuator 100 of FIG. 1A.

In actuator 100, duality is achieved by summing the equal prime mover forces against output plate 106 through a pair of geared transmissions. Prime mover 110 drives gear train 104 to create a torque on the output attachment plate through clutch 114. Similarly, prime mover 102 drives gear train 112 to create a torque on the output attachment plate 106 through clutch 108. Should the subsystem incorporating prime mover 102 and gear train 112 fail, then clutch 108 would be energized to take that subsystem out of service. In this case, the remaining subsystem would either carry 50% of the required output, which may be entirely adequate for most operations, or it could be peaked up past its normal performance level for a short period until the system could be taken down for maintenance. In certain embodiments, prime movers 102 and 110 exhibit substantially identical performance characteristics. In other words, prime movers 102 and 110 are able to generate substantially identical torque output, and operate across a similar range of speeds.

Output plate 106 contains a torque sensor 116. Output plate 106 is separated from the input attachment 118 by principal bearing 120. As described above, output plate 106 is connected to the input drive systems by clutches 108 and 114. Clutch 114 is driven by sun gear 122, supported by bearings 124 and bull gear 126. Bull gear 126 is meshed with planet gear set 128 supported by bearings 124 and held in place by planet cage 132. Planet cage 132 is driven by armature 134 and supported by bearings 136.

The fixed motor field 138 operates on armature 134. Fields 138 and 140 are fixed to the rigid fixed structure 142 attached to the outer shell 146 of the actuator 100 through end cap screws 144. Rigid fixed structure 142 also employs screws 148 to fix the stationary shaft 150, which supports bearings 152 for armature 154. Armature 154 is also supported by bearing 156 and planet cage 158, using bearings 160 to support planet gear set 162. Planet gear set 162, in turn, meshes with the stationary bull gear 164 and sun gear 166, supported by bearings 170. Sun gear 166 then drives the output plate 106 through clutch 108.

Auxiliary bearing 172 gives further support to the output plate 106 from the stationary shaft 150. A similar set of auxiliary bearings 174 are used to provide mutual support between the planet gear cages 158 and 132. The result is that two prime mover-transmission subsystems create independent torques on output plate 106 through clutches 108 and 114.

This system incorporates no single point failure, since it can still operate even under a total, or partial, failure of 50% of the actuator's resources. This system can be described as being reconfigurable in the level of force to be supplied by each prime mover to the output. Where force balancing between the two equal subsystems may be achieved in real time, this actuator may perform at an even higher level of performance.

Actuator 100 employs a certain geartrain architecture, but it will be understood by those of skill in the art that a number of geartrain geometries and architectures would be operable in the present invention without departing from the spirit and scope of the present invention. Additionally, while actuator 100 employs a pair of fixed fields and rotating armatures in concentric arrangement, nothing within the spirit and scope of the present invention requires this geometry. In alternate embodiments, the armatures could be fixed, or could be disposed adjacent to the fields in a pancake arrangement.

Actuator 100 described above provides a high level of performance in a short, space-efficient package having a relatively small outer diameter. Certain rotary actuator applications may occur where there is a need for the diameter of the actuator to be minimized while the length of the actuator is not critical. This is the case, for example, for trim tabs for water vanes on ships or ailerons on aircraft.

Figure 2A:
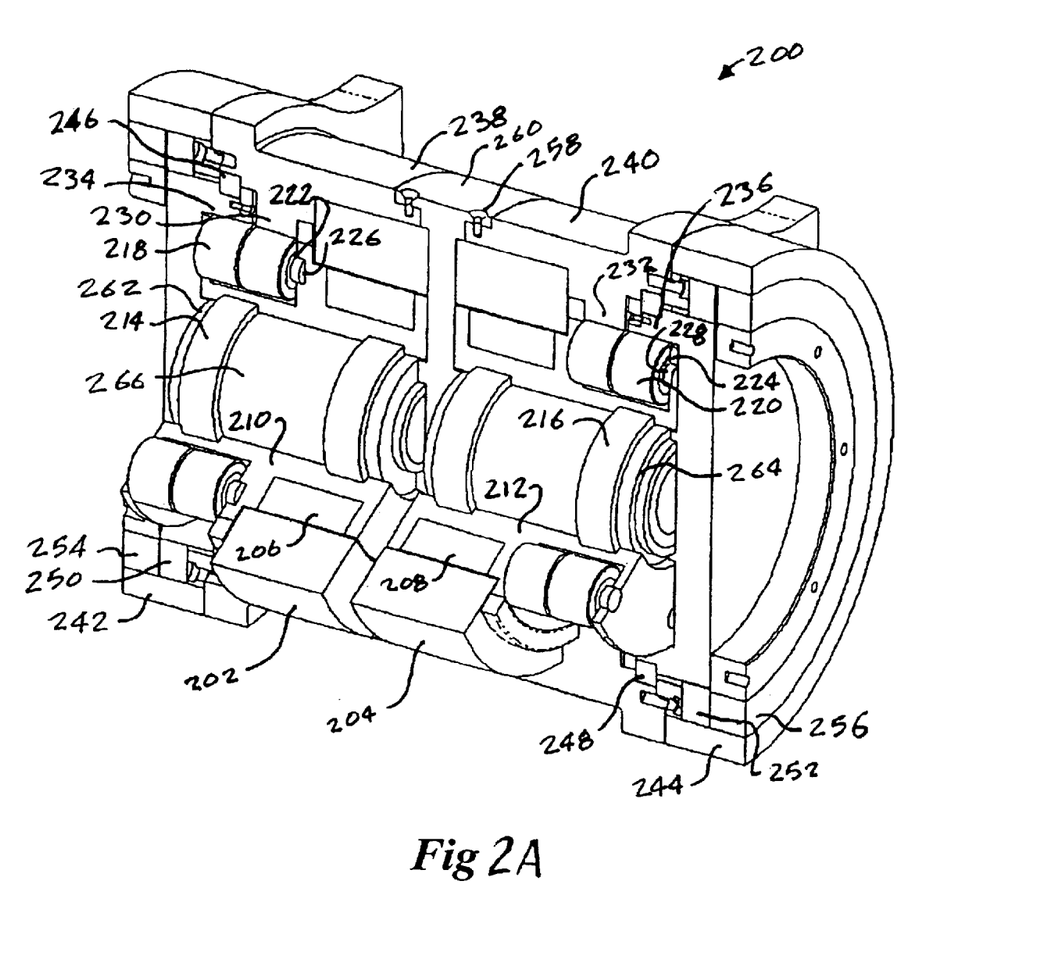
FIG. 2A is a three-dimensional section view of a second embodiment of a rotary actuator in accordance with the present invention.
Figure 2B:
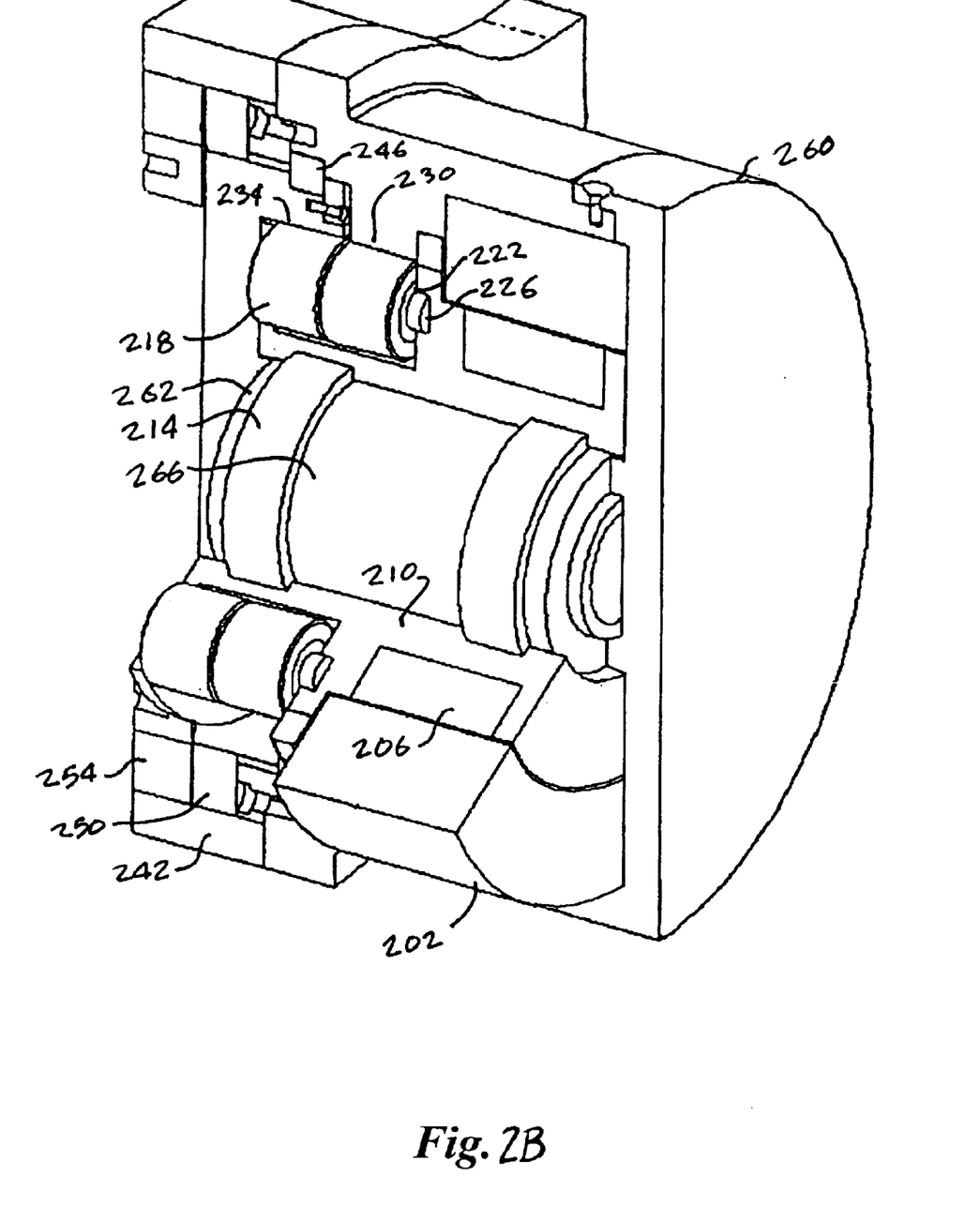
FIG. 2B is a three-dimensional section view of the first prime mover section of the rotary actuator of FIG. 2A.
Figure 2C:
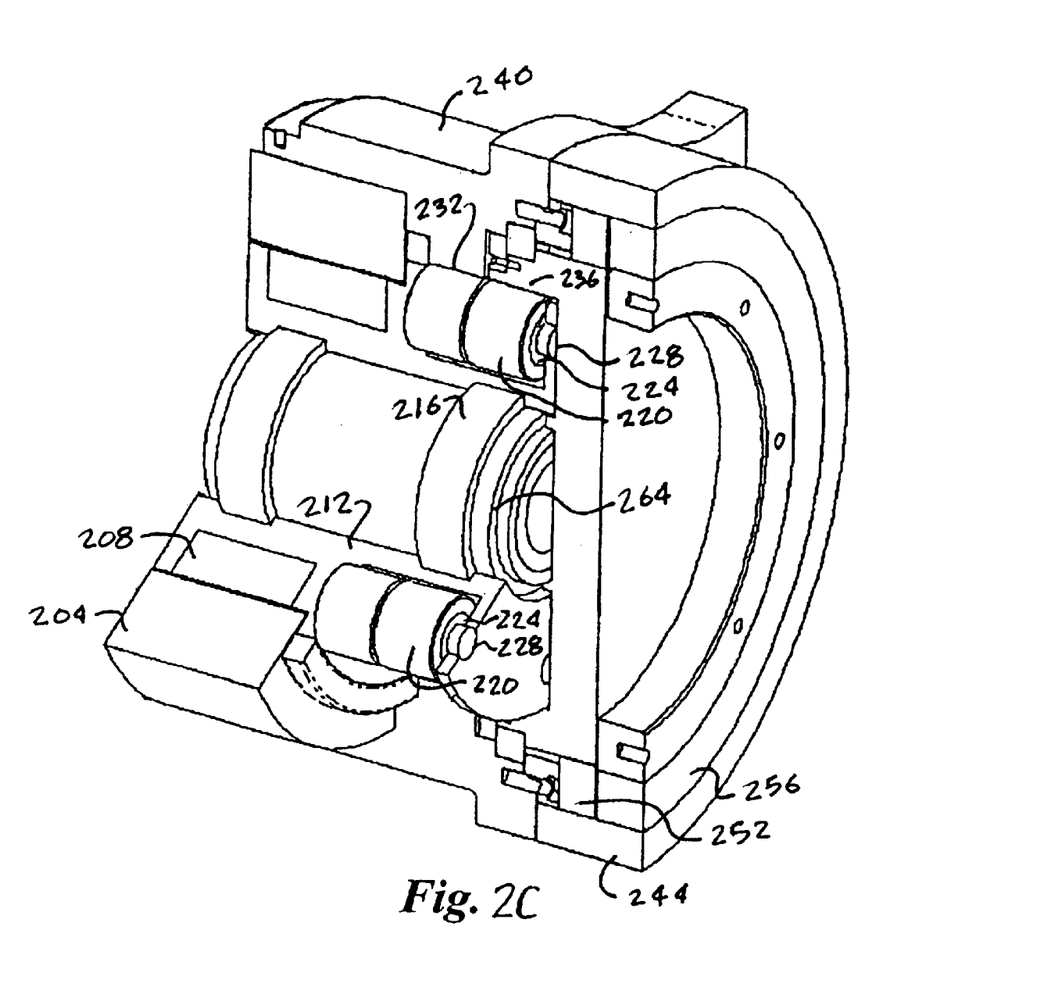
FIG. 2C is a three-dimensional section view of the second prime mover section of the rotary actuator of FIG. 2A.

Since length is not critical, then two symmetrically placed mirror image actuators, or prime mover transmissions, can be combined in a long cylindrical shell. FIG. 2A is a three-dimensional section view of a second embodiment of a rotary actuator 200 having a symmetrical geometry in accordance with the present invention. FIG. 2B is a three-dimensional section view of the first prime mover and gear train section of the rotary actuator 200 of FIG. 2A. FIG. 2C is a three-dimensional section view of the second prime mover and gear train section of the rotary actuator 200 of FIG. 2A.

FIGS. 2A–2C provide a detailed graphical representation of a dual symmetric torque summing fault tolerant rotary actuator 200. FIG. 2A shows the general layout of rotary actuator 200 wherein two prime movers each drive a gear train, each of which drives an output attachment plate through a torque sensor and a clutch.

As seen in FIGS. 2A–2D, motor fields 202 and 204 interact with armatures 206 and 208 to drive planet gear cages 210 and 212. Planet gear cages 210 and 212 are supported by needle bearings 214 and 216, and carry planet gear sets 218 and 220 in bearings 222 and 224 on shafts 226 and 228.

The planet gear sets 218 and 220 mesh with the stationary bull gears 230 and 232 and rotating sun gears 234 and 236. The bull gears 230 and 232 are rigidly attached to the outer shells 238 and 240 of the actuator 200. The sun gears 234 and 236 are rigidly attached to the output attachment plates 242 and 244. The bull gears 230 and 232 and sun gears 234 and 236 are separated by the principal bearings 246 and 248, which also act as the bearings of the joint of which this actuator 200 is a part.

The output attachment plates 242 and 244 incorporate torque sensors 250 and 252 and release clutches 254 and 256. The shell is assembled in two halves using assembly screws 258 with a fixed structure 260 in the center that also holds the centering shaft 266 of the actuator 200, holding support bearings 262 and 264.

The output attachments shown are configured for yokes. Other geometries are possible wherein attachments are molded into the shell or as axial extensions to the face of the output plates. This latter arrangement would make the assembly longer and slimmer, which is useful as an actuator for a water vane trim tab for a ship or an aileron for an airplane. The yoke arrangement shown would be useful as an elbow in a robot manipulator or similar device.

Figure 3:
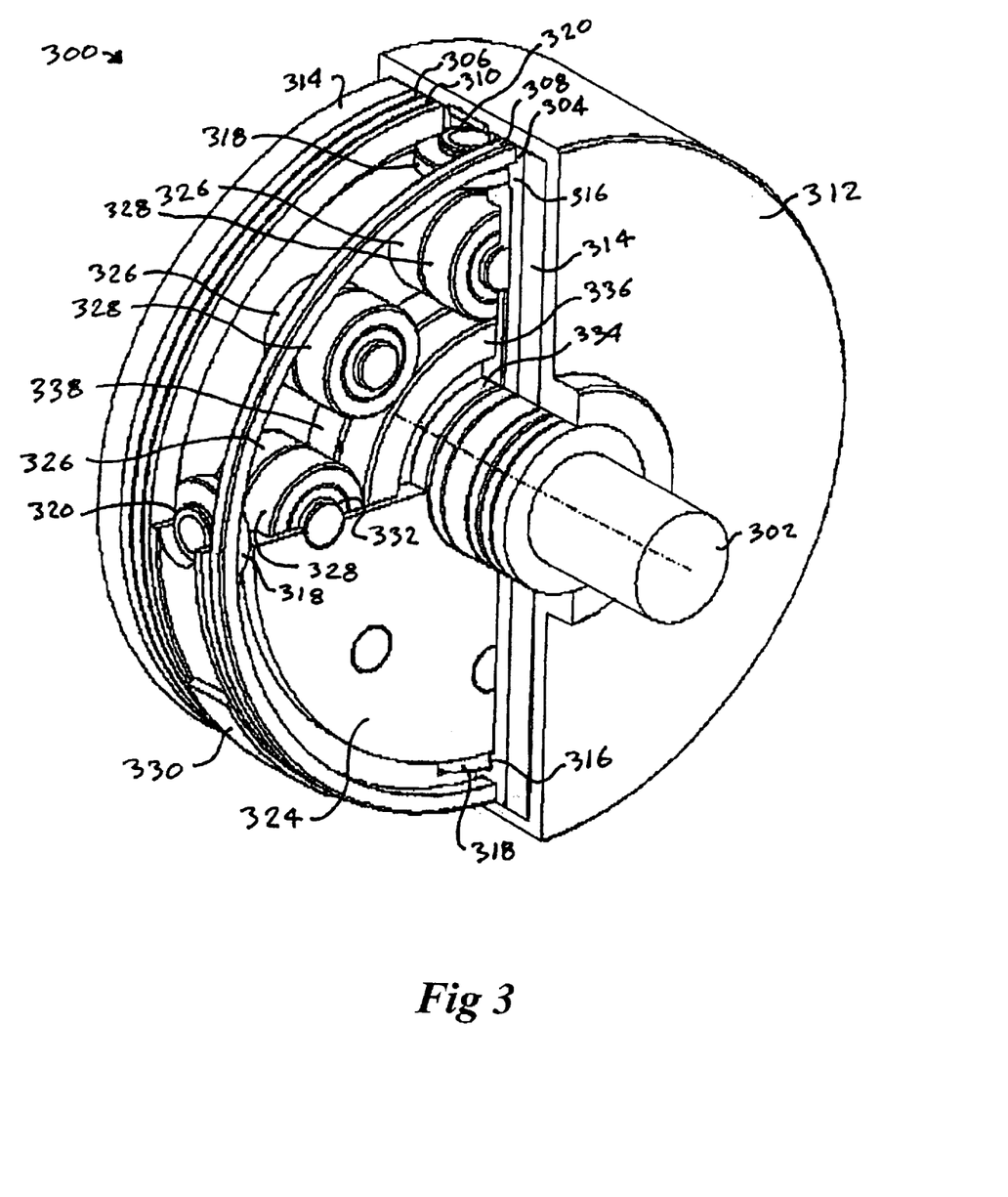
FIG. 3 is another view of a rotary actuator in accordance with the present invention.

A third embodiment of a rotary actuator 300 according to the present invention is shown in FIG. 3. The central axis of actuator 300 is the center line of the output shaft 302. The two independent prime movers are permanent magnet disks 304 and 306 that rotate about the center line supported by bearings 308 and 310 supported directly by the actuator shell 312. The stationary magnetic fields 314 are rigidly held by the outer walls of the actuator 300 and are independently controlled by a power supply module. In one embodiment, actuator 300 may employ a power supply module provided by Silicon Power Corporation of Eaton, Pa. Another suitable power supply module is manufactured by ARM Automation, Inc. of Austin, Tex.

Each of the prime mover magnet disks 304 and 306 drives a radial gear 316, which is meshed with differential gears 318 supported by bearings 320 and 322 in cage 324, which rotates about the major center line of the actuator module 300. The differential gears 318 will be stationary relative to magnet disks 304 and 306 if they rotate at the same speed, or produce the same torque. Otherwise, just as in an automobile drive train, the differential gears 318 will rotate to accommodate this difference in velocity.

Where there is a speed difference between magnet disk 304 and magnet disk 306, the differential gears 318 will drive the cage 324 at the average of the angular velocities of disks 304 and 306. Cage 324 contains the planet gears 326 and 328, which are rigidly connected to each other and supported on the ends by bearing 10 all held by the cage 324. Cage 324 is the central structural element in actuator 300.

The section holding the race for bearing 330 and bearings 332 is assembled from machined sections. There may be four differential gears and up to eight planetary gears 326 and 328 held by the cage 324 which is supported by bearings 334 as well as bearing 330.

The planet gears 328 drive a sun gear 336, which is machined into shaft 302. Planet gears 326 roll over a stationary bull gear 338. This stationary bull gear 338 is rigidly bolted to the actuator shell 312 with benefit of a centering boss to accurately locate it on the main center line of actuator 300.

Additional objects, advantages and novel features of the invention as set forth in the description, will be apparent to one skilled in the art after reading the foregoing detailed description or may be learned by practice of the invention. The objects and advantages of the invention may be realized and attained by means of the instruments and combinations particularly pointed out here.

What is claimed is:

1. A rotary actuator comprising:
   a fixed structure;
   a first prime-mover having a first portion fixed to the fixed-structure; and a second portion rotationally movable with respect to the first portion;
   a second prime mover, having substantially identical performance characteristics to the first prime mover, having a first portion fixed to the fixed structure, and a second portion rotationally movable with respect to the first portion;
   a first gearset having an input-portion connected to the second portion of the first prime mover and an output portion;
   a second gearset, having substantially identical performance characteristics to the first gearset, having an input connected to the second portion of the second prime mover and an output portion;
   a first clutch having an input portion connected to the output portion of the first gearset and an output portion;
   a second clutch having an input portion connected to the output portion of the second gearset and an output portion;
   an actuator output rotationally fixed to the output portion of the first clutch and the output portion of the second clutch.

2. The rotary actuator of claim 1 wherein the first and second gearsets are planetary gearsets.

3. The rotary actuator of claim 1 wherein the first prime mover is disposed adjacent to the second prime mover.

4. The rotary actuator of claim 1 wherein each prime mover comprises a field and an armature.

5. The rotary actuator of claim 4 wherein the fields and armatures are concentric.

6. The rotary actuator of claim 4 wherein the fields and armatures are disposed adjacent to one another.

7. The rotary actuator of claim 1 wherein the first prime mover is disposed inside and concentric to the second prime mover.

8. The rotary actuator of claim 1 wherein torque is created by one or more of the groups consisting of the first prime mover on the first actuator output through the first clutch and the second prime mover on the second actuator output through the second clutch.

9. The rotary actuator of claim 8 wherein the torque of the one or more of the groups is created independent of the other group.

10. The rotary actuator of claim 1 further comprising one or more torque sensors.

11. The rotary actuator of claim 1 wherein the rotary actuator operates under total or partial failure of one of the groups consisting of first prime mover and second prime mover.

12. The rotary actuator of claim 4 wherein the armatures are fixed or disposed adjacent to the fields in a pancake arrangement.

13. A rotary actuator comprising:
    a fixed structure;
    a first prime mover having a first portion fixed to the fixed structure, and a second portion rotationally movable with respect to the first portion;

a second prime mover, having substantially identical performance characteristics to the first prime mover, having a first portion fixed to the fixed structure, and a second portion rotationally movable with respect to the first portion;

a first gearset having an input portion connected to the second portion of the first prime mover and an output portion;

a second gearset, having substantially identical performance characteristics to the first gearset, having an input connected to the second portion of the second prime mover and an output portion;

a first clutch having an input portion connected to the output portion of the first gearset and an output portion;

a second clutch having an input portion connected to the output portion of the second gearset and an output portion, wherein the first and second clutches, respectively, are operable to be coupled to an actuator output.

14. The rotary actuator of claim 13 wherein the first and second gearsets are planetary gearsets.

15. The rotary actuator of claim 13 wherein the first prime mover is disposed adjacent to the second prime mover.

16. The rotary actuator of claim 13 wherein each prime mover comprises a field and an armature.

17. The rotary actuator of claim 16 wherein the fields and armatures are concentric.

18. The rotary actuator of claim 16 wherein the fields and armatures are disposed adjacent to one another.

19. The rotary actuator of claim 13 wherein the actuator output is rotationally fixed to the output portion of the first clutch and the output portion of the second clutch.

20. The rotary actuator of claim 13 further comprising one or more torque sensors.

21. The rotary actuator of claim 13 wherein the rotary actuator operates under total or partial failure of one of the groups consisting first prime mover and second prime mover.

22. The rotary actuator of claim 13 further comprising a second actuator output rotationally fixed to the output portion of either the first or second clutch.

* * * * *